(12) United States Patent
Tang (10) Patent No.: US 7,586,740 B2
(45) Date of Patent: Sep. 8, 2009

(54) HOUSING OF FOLDABLE ELECTRONIC DEVICE

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/145,468

(22) Filed: Jun. 24, 2008

(65) Prior Publication Data
US 2009/0168342 A1    Jul. 2, 2009

(30) Foreign Application Priority Data
Dec. 27, 2007    (CN)    ............... 200710203489

(51) Int. Cl.
*G06F 1/16*    (2006.01)

(52) U.S. Cl. ............... 361/679.27; 312/223.2; 206/501; 422/104

(58) Field of Classification Search ... 312/223.1–223.6, 312/7.2; 206/501, 502; 361/679.06, 679.07, 361/679.08, 679.03, 679.55, 679.56; 62/159; 211/4, 60.1; 422/102, 104

See application file for complete search history.

(56) References Cited

U.S. PATENT DOCUMENTS

| | | | |
|---|---|---|---|
| 2005/0155889 A1* | 7/2005 | Lown | 206/501 |
| 2006/0226742 A1* | 10/2006 | Gevaert | 312/7.2 |
| 2007/0210684 A1* | 9/2007 | Lin et al. | 312/223.2 |

* cited by examiner

*Primary Examiner*—Hung V Duong
(74) *Attorney, Agent, or Firm*—Zhigang Ma (57) ABSTRACT

An exemplary housing of a foldable electronic device includes a first cover, a second cover, a handle, latching members, and resilient members. The first cover includes lock portions. The handle includes two pivot portions and two first transmission portions. Each latching member includes a second transmission portion and a lock receiving portion. Each lock receiving portion is configured for engaging with one lock portion. Each second transmission portion is configured for engaging with one first transmission portion. The pivot portions are engaging with the retaining portions such that the handle is rotatable around the pivot portion. When the handle rotates, it releases the lock portions from the latching members thus opens the housing.

13 Claims, 12 Drawing Sheets

HOUSING OF FOLDABLE ELECTRONIC DEVICE

BACKGROUND OF THE INVENTION

1. Field of the Invention

The present invention generally relates to housings of foldable electronic devices, and particularly, to a housing typically adopted by notebooks.

2. Discussion of the Related Art

Figure 11:
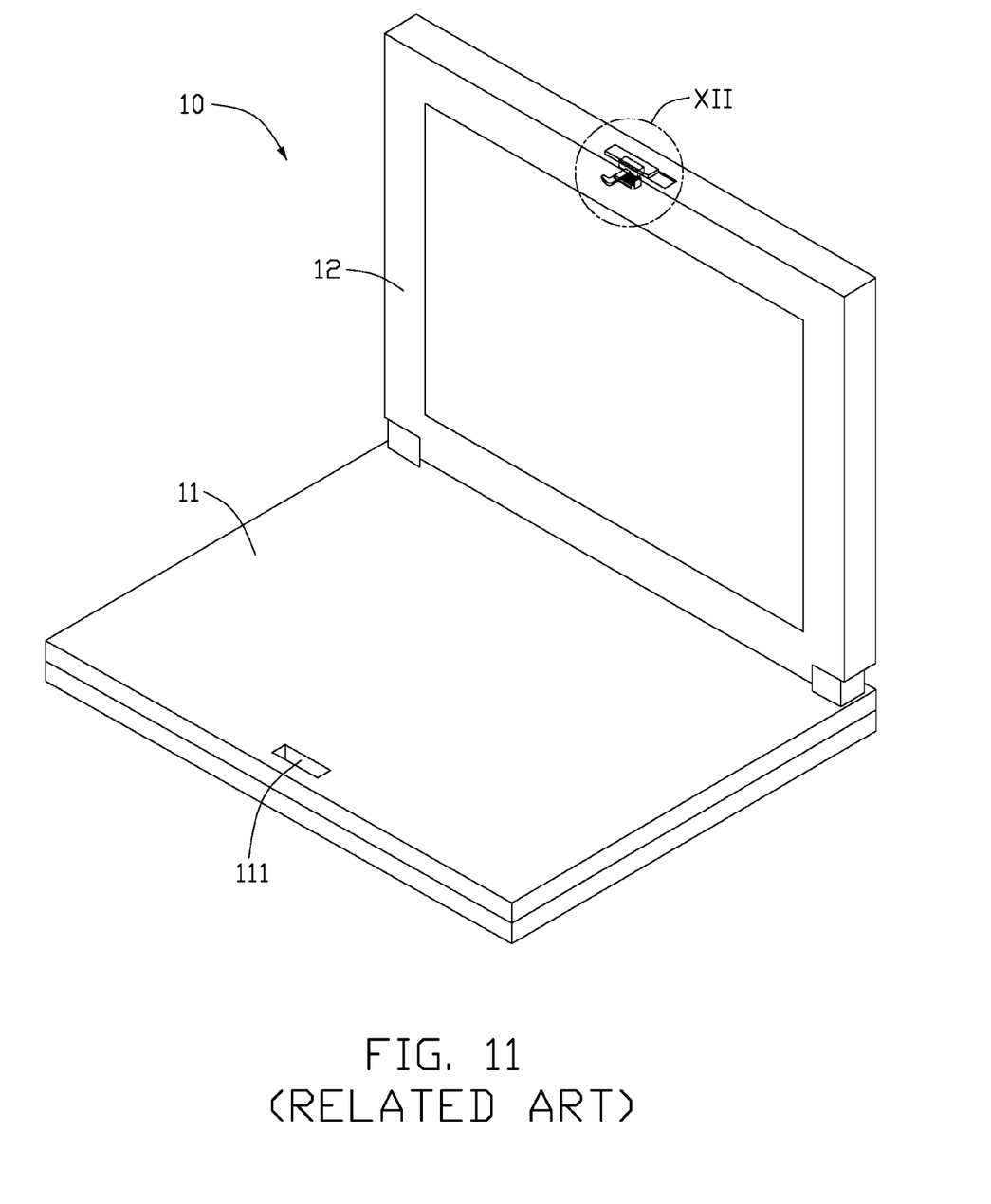
FIG. 11 is an isometric view of a conventional housing of a foldable electronic device.
Figure 12:
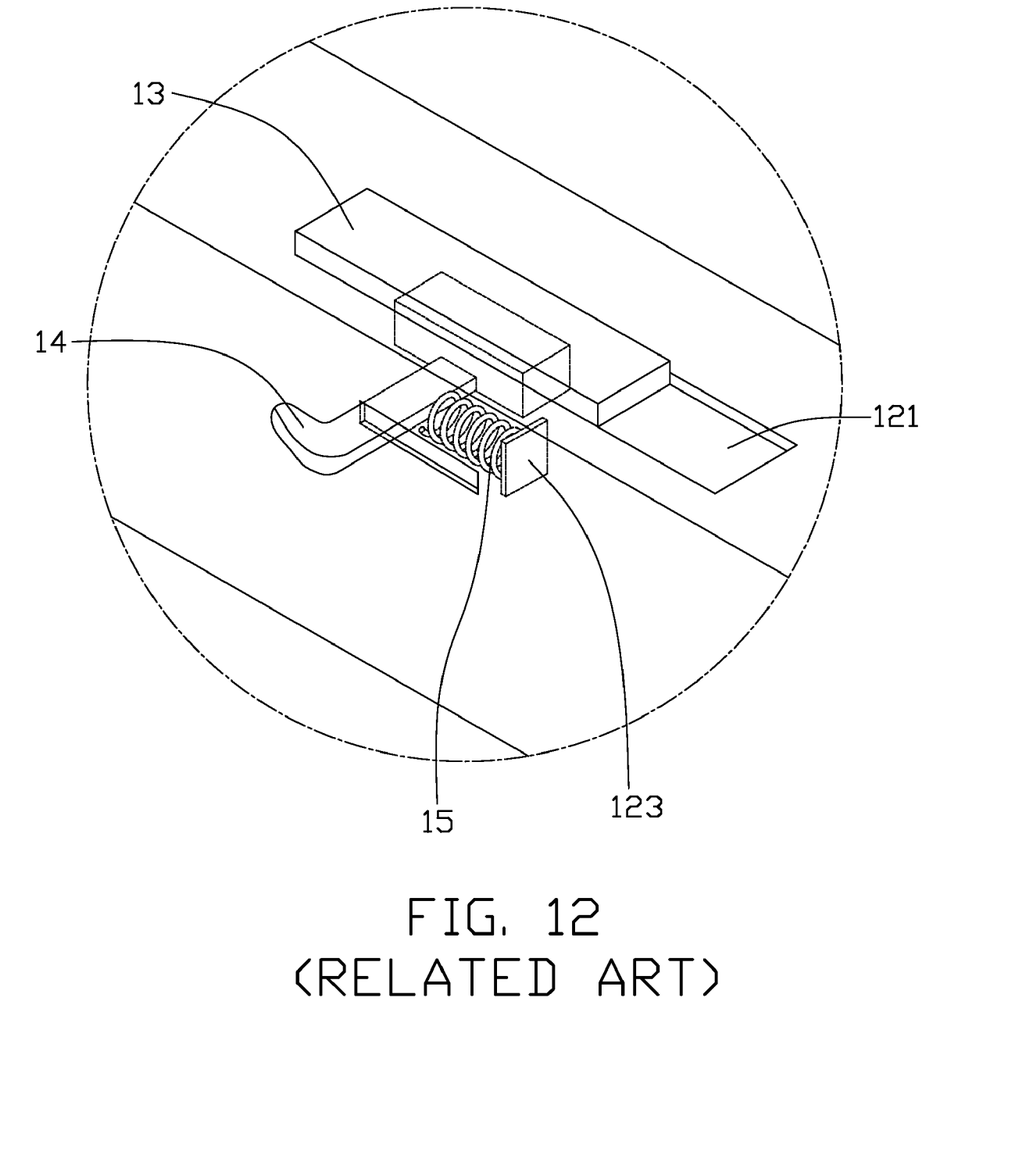
FIG. 12 is an enlarged view of the circled portion XII in FIG. 12.

Referring to FIGS. 11 and 12, a typical housing 10 of a foldable electronic device is shown. The housing 10 includes a bottom cover 11, a top cover 12, a sliding member 13, a hook 14, and a spring 15. The bottom cover 11 defines a latching groove 111 adjacent to an edge of the bottom cover 11. The top cover 12 defines a rectangular mounting groove 121 on an edge of the top cover 12 and forms a resisting member 123 adjacent to the mounting groove 121. The sliding member 13 is a rectangular block in shape. The sliding member 13 is disposed in the mounting groove 121 and is able to slide in the mounting groove 121. The hook 14 is configured to be latched in the latching groove 111. One end of the hook 14 is fixed to the sliding member 13 so that the hook 14 is movable together with the sliding member 13. One end of the spring 15 abuts the resisting member 123 and another end of the spring 15 abuts the hook 14 so that the hook 14 and the sliding member 13 are kept on a side of the mounting groove 121.

To open the top cover 12, a user has to pry the sliding member 13 and drive the sliding member 13 to move towards the side of the mounting groove 121 with a finger. However, the sliding member 13 is generally designed to be of small sizes. As a result, the contact surface of the sliding member 13 is relatively small. In addition, when driving the sliding member 13, the finger exerts a force to slide the sliding member 13, and likely causing slippage between the finger and the sliding member 13. As a result, it is difficult to open the top cover 12.

Therefore, a new housing of a foldable electronic device is desired in order to overcome the above-described shortcoming.

SUMMARY

A housing of a foldable electronic device includes a first cover, a second cover, a handle, a latching member, and a resilient member. The first cover includes a lock portion. The second cover includes a retaining portion. The handle and the latching member are disposed on the second cover. The handle includes a contact portion, a pivot portion aligned along a common axis, and a first transmission portion. At least a portion of the contact portion is exposed out of the second cover. The pivot portion is capable of engaging with the retaining portion such that the handle is rotatable relative to the pivot portion. The latching member includes a lock receiving portion configured for engaging with the lock portion and a second transmission portion with a slanted surface configured for engaging with the first transmission portion. When the handle rotates, it releases the lock portions from the latching members. The resilient member is configured for driving the handle to rotate back to its original position after the handle has rotated and the initial force to rotate the handle is released.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present housing of the foldable electronic device. Moreover, in the drawings, like reference numerals designate corresponding parts throughout several views, and all the views are schematic.

DETAILED DESCRIPTION OF THE PREFERRED EMBODIMENT

Reference will now be made to the drawings to describe a preferred embodiment of the present housing of the foldable electronic device in detail.

The present housing is used for foldable electronic devices, such as notebooks, cell phones, media players, and so on. In the preferred embodiment, the housing of a notebook is taken as exemplary to describe the housing of the present invention.

Figure 1:
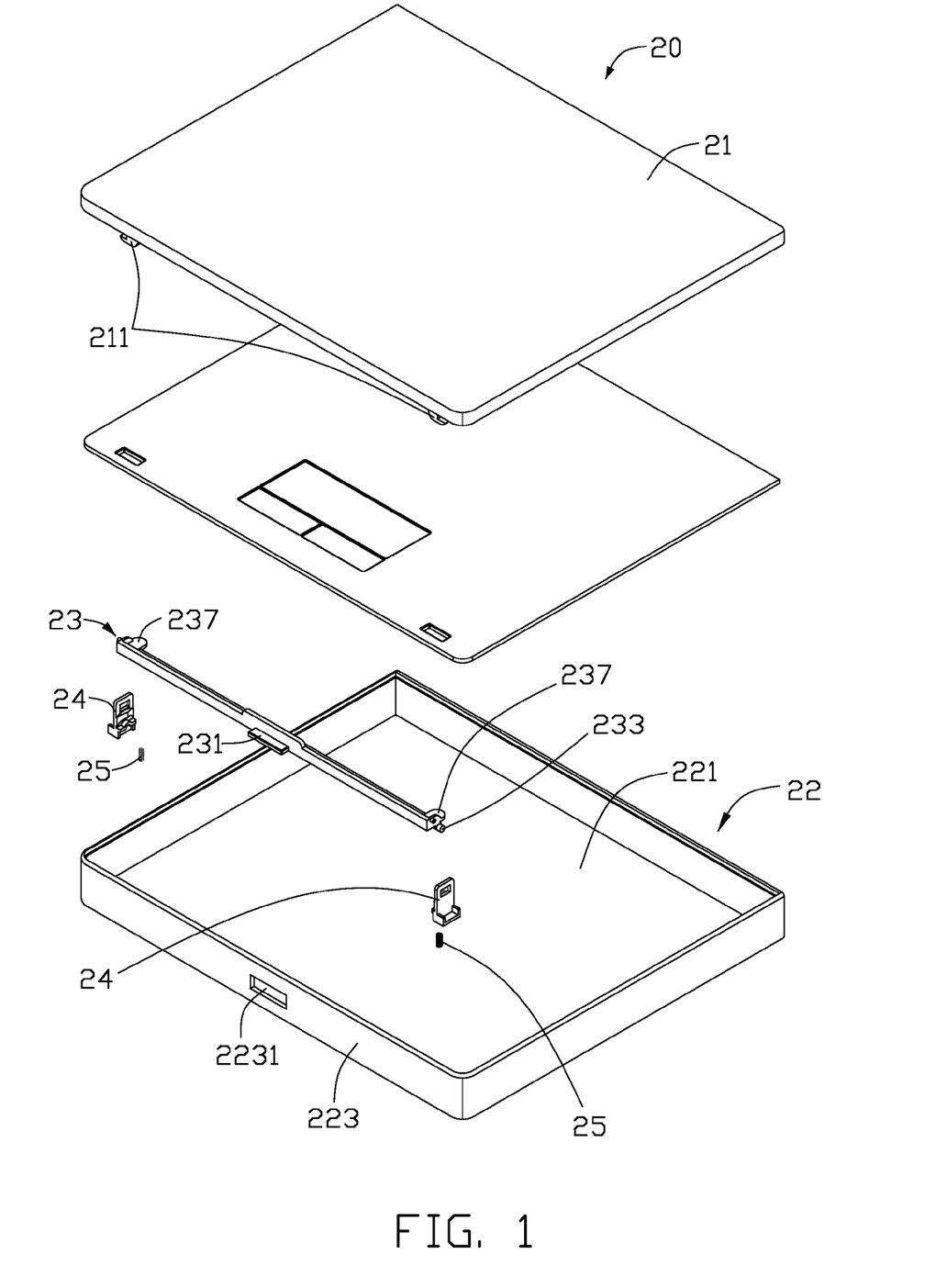
FIG. 1 is an exploded, isometric, front view of a housing of a foldable electronic device in accordance with a preferred embodiment of the present invention.

Referring to FIG. 1, a housing 20 of the preferred embodiment for a notebook is shown. The housing 20 includes a first cover 21, a second cover 22, a handle 23, two latching members 24, and two resilient members 25. The first cover 21 includes two lock portions 211. In the illustrated embodiment, each lock portion 211 is basically a resilient hook. Each resilient member 25 is a spring. The second cover 22 includes a base 221 and a plurality of sidewalls 223. The sidewalls 223 extend from the base 221. One of the sidewalls 223 (hereinafter referred to as front sidewall 223a) defines an opening 2231.

Figure 2:
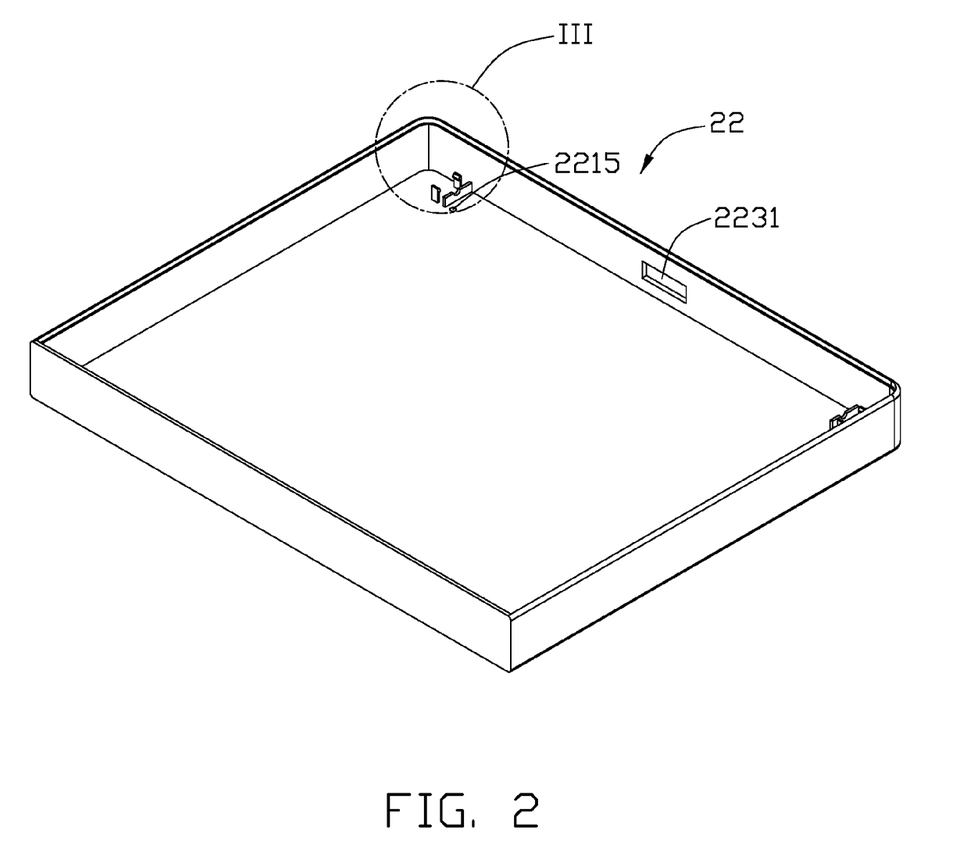
FIG. 2 is an isometric, back view of a second cover in FIG. 1.
Figure 3:
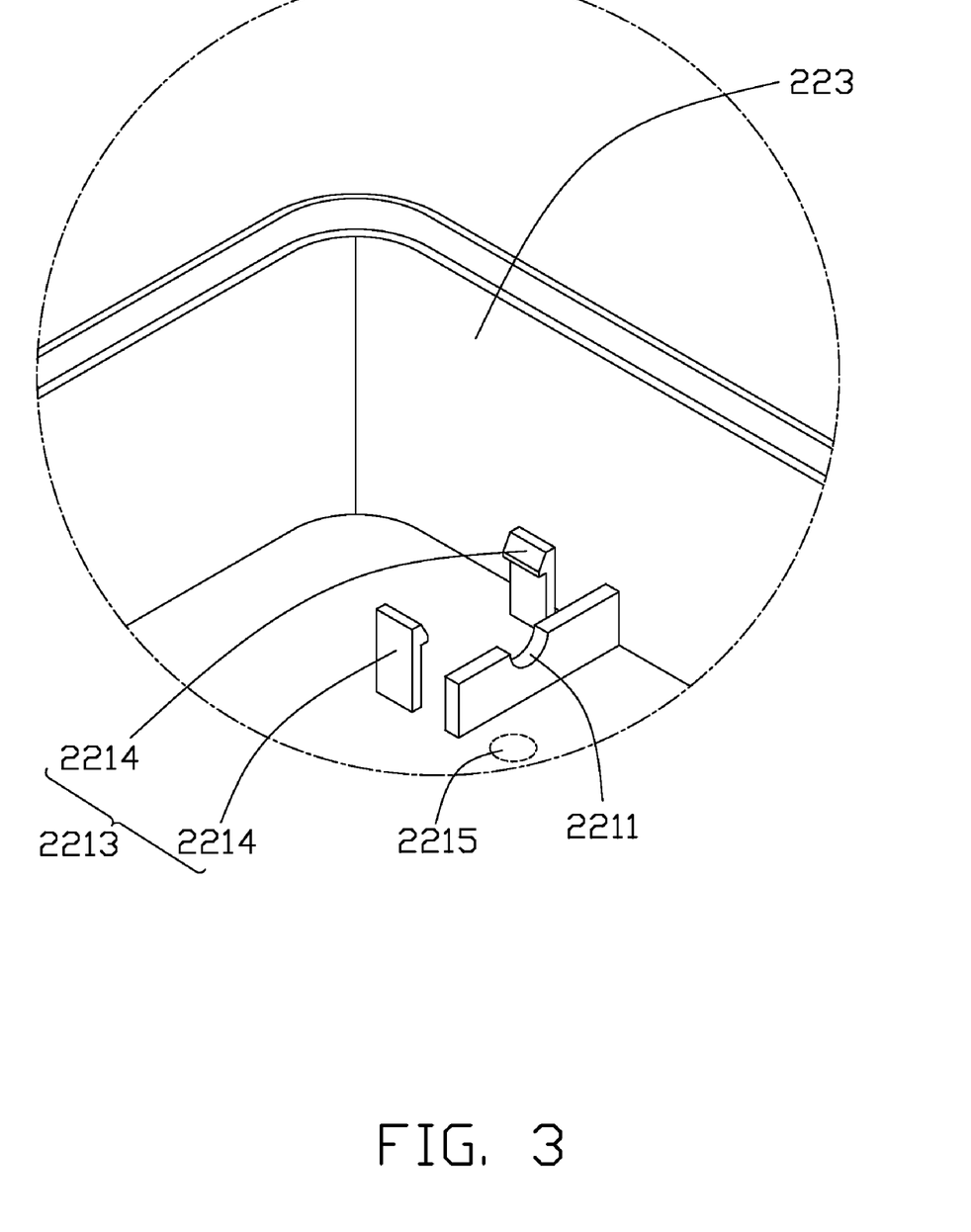
FIG. 3 is an enlarged view of the circled portion III in FIG. 2.

Also referring to FIGS. 2 and 3, the base 221 forms two retaining portions 2211, two fastening structures 2213, and two receiving portions 2215. In the illustrated embodiment, each retaining portion 2211 is a protrusion defining a U-shaped groove in the top surface of each of the retaining portions 2211. Each fastening structure 2213 includes two elastic hooks 2214. The elastic hooks 2214 are formed on the base 221. Each receiving portion 2215 is configured for resisting the corresponding resilient member 25.

Figure 4:
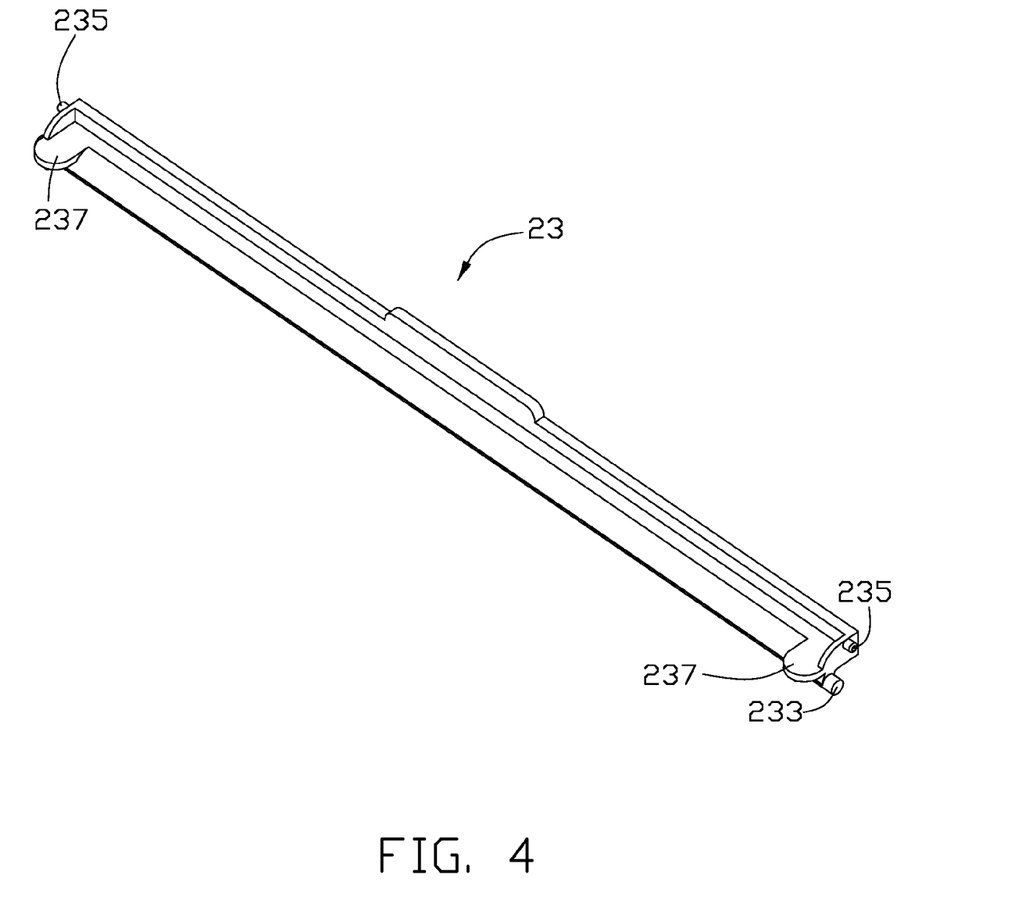
FIG. 4 is an isometric view of a handle in FIG. 1.

Also referring to FIG. 4, the handle 23, which is elongated, includes a contact portion 231, two pivot shafts 233, two transmission portions 235, and two resisting portions 237. The contact portion 231 is smaller than the opening 2231 such that the contact portion 231 is able to pass through the opening 2231 and to move upwards or downwards in the opening 2231.

The two pivot shafts 233 are located at the two opposite ends of the handle 23 correspondingly. Each of the pivot shafts 233 is configured for engaging with one of the retaining portions 2211 correspondingly such that the handle 23 is rotatably positioned on the second cover 22 and the handle 23 is rotatable relative to the pivot shafts 233. It should be pointed out that, each pivot shaft 233 may be replaced by a cylindrical groove, correspondingly a pivot shaft can be formed on the base 221 to engage in the cylindrical groove. Each transmission portion 235 is a cylindrical arm adjacent to one pivot shaft 233 and the end surface of each transmission portions 235 is spherical.

The contact portion 231 and the resisting portions 237 are located on the opposite sides of the common axis of the pivot shaft 233. When an external force along a direction to the first cover 21 is applied on the contact portion 231, the handle 23 rotates relative to the common axis of the pivot shaft 233, thus a distance from the resisting portion 237 to the base 221 is reduced, thus the resilient members 25 is compressed by the resisting portion 237 and the base 221. When the external force is released, the handle 23 is pushed by the resilient members 25 to rotate back to its original position.

It can be understood that, the contact portion 231 and the resisting portion 237 may also be located on a same side of the common axis of the pivot shaft 233. When the contact portion 231 is pressed by an external force, the handle 23 rotates relative to the pivot shaft 233 and pulls the resilient members 25. After the external force is released, the resilient members 25 pull the handle 23 to rotate it back to its original position.

Figure 5:
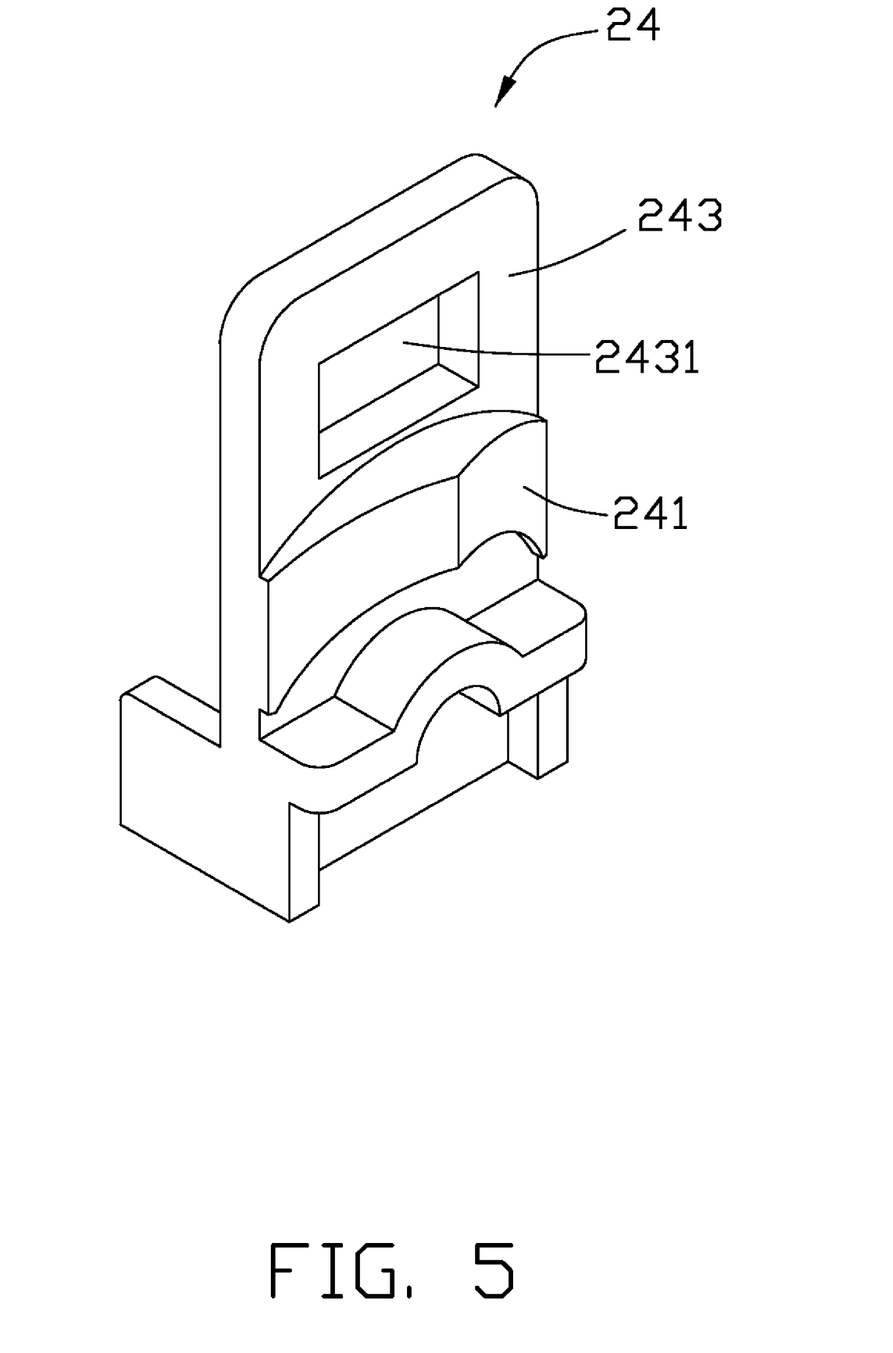
FIG. 5 is an isometric view of a latching member in FIG. 1.

Referring to FIGS. 1 and 5, each latching member 24 is a rectangular block made of resilient material, such as plastic. One end of the latching member 24 forms a lock receiving portion 243 and a transmission portion 241. The lock receiving portion 243 is configured for engaging with one of the lock portions 211 of the first cover 21. The transmission portion 241 is adjacent to the lock receiving portion 243 and configured for engaging with a corresponding transmission portion 235 of the handle 23. In the illustrated embodiment, each of the transmission portions 241 has a slanted surface. The lock receiving portion 243 defines a hole 2431.

Figure 6:
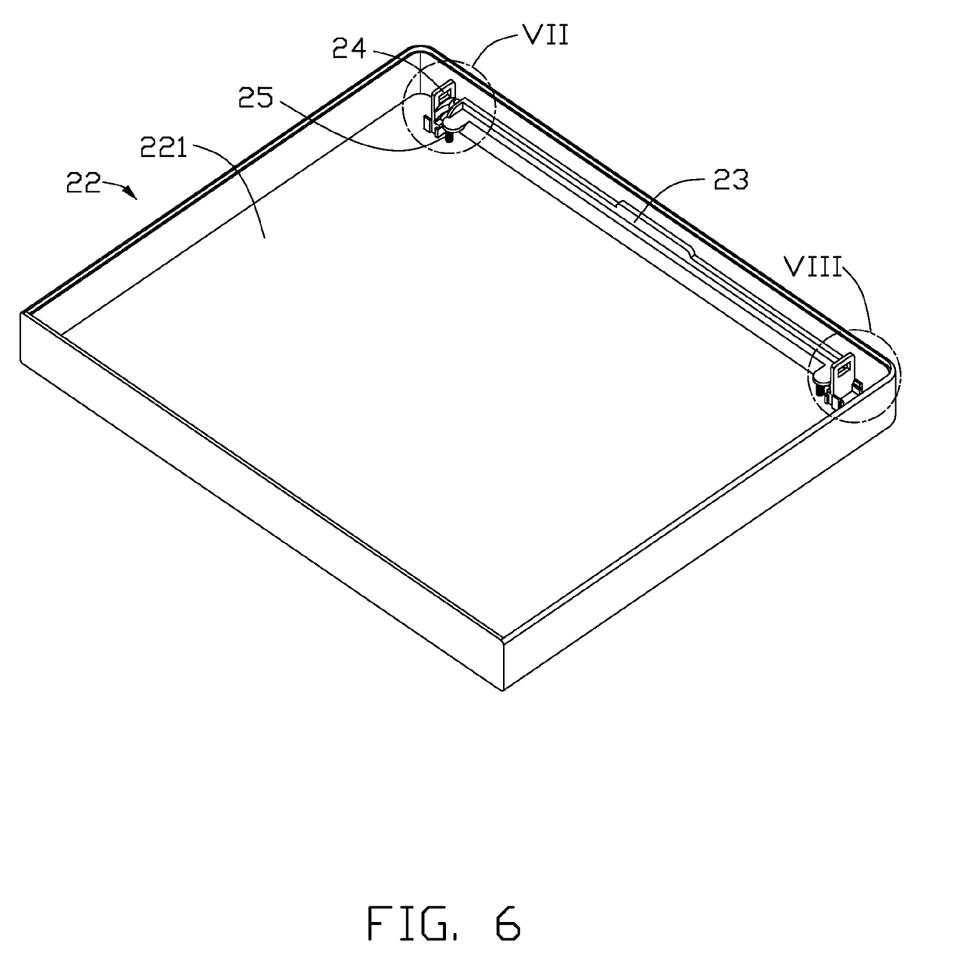
FIG. 6 is an assembled, isometric view of a portion of the housing of FIG. 1.
Figure 7:
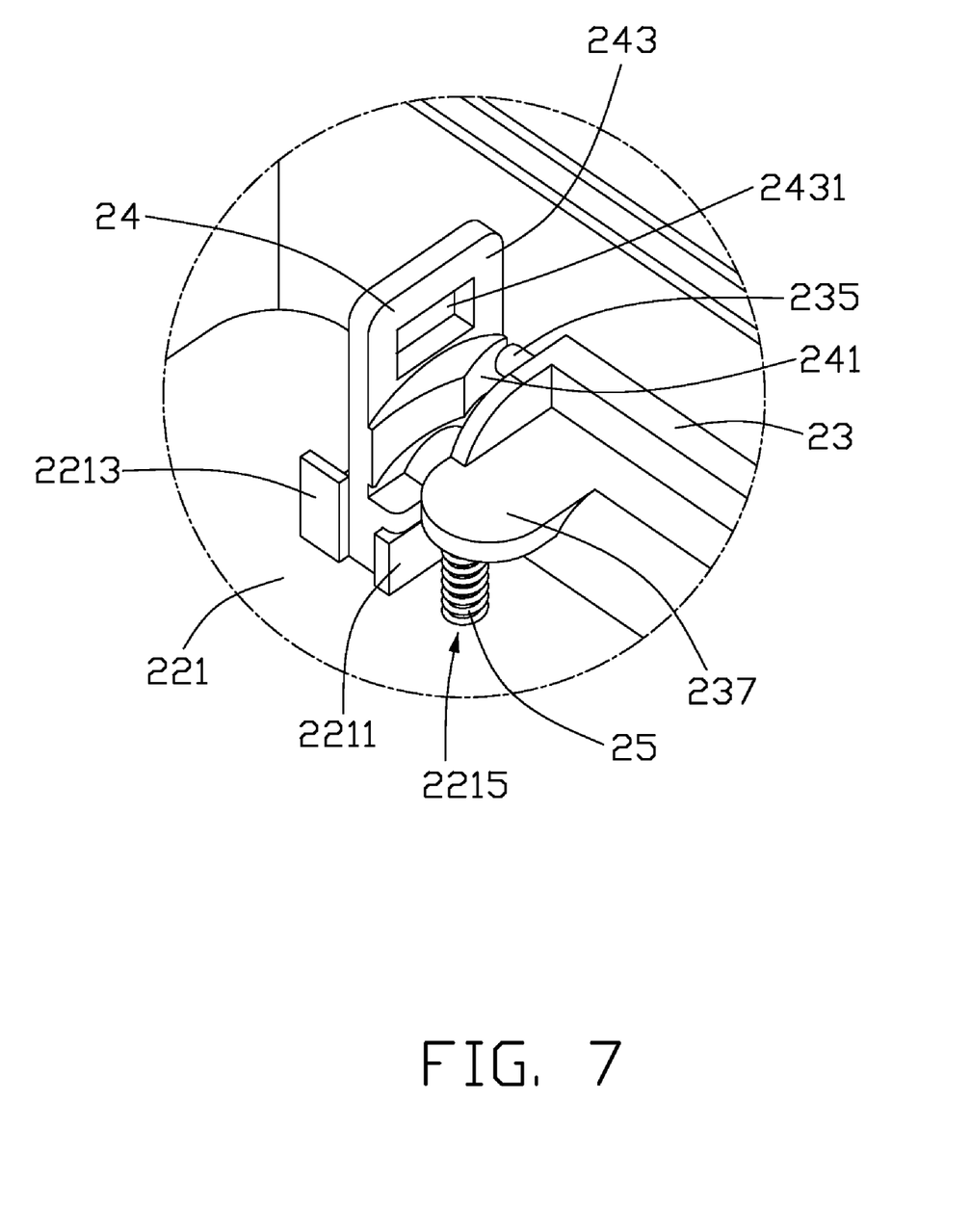
FIG. 7 is an enlarged view of the circled portion VII in FIG. 6.
Figure 8:
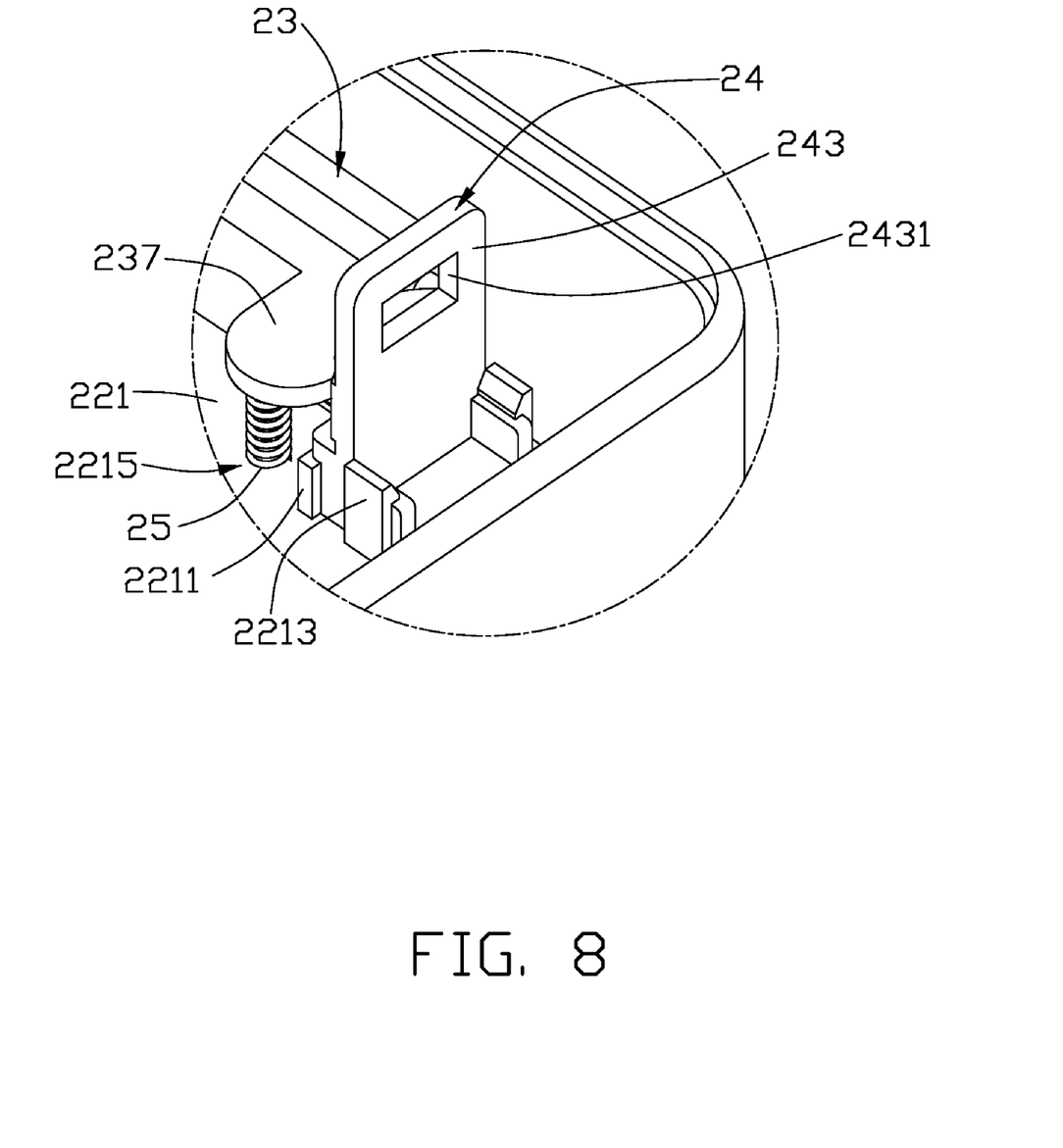
FIG. 8 is an enlarged view of the circled portion VII in FIG. 6.

Also referring to FIGS. 6 through 8, in an assembly process, each of the latching members 24 is fixed to a corresponding fastening structure 2213, and the contact portion 231 in FIG. 1 is inserted through the opening 2231. Each of the retaining portions 2211 engages with a corresponding pivot shaft 233. One end of each of the resilient members 25 abuts one of the resisting portions 237 and the other end of the resilient member 25 is received in one of the receiving portions 2215.

It should be pointed out that, each fastening structure 2213 includes two spring sheets 2214 formed on the base 221, the spring sheets are hook-shaped at one end and resilient such that each latching member 24 can be easily pushed down and latched onto the fastening structure 2213. In addition, latching members 24 can be easily detached from fastening structures 2213 by slightly bending the fastening structure 2213 to open them wide.

Figure 9:
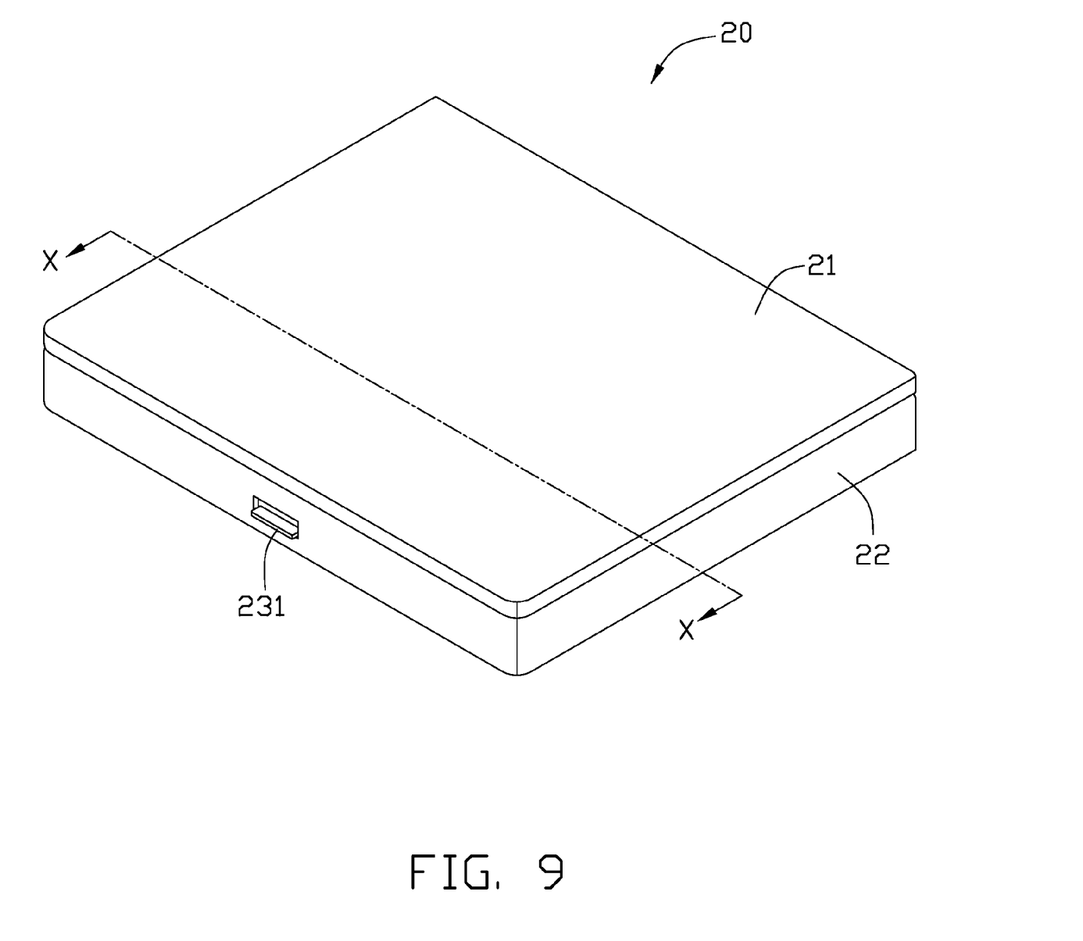
FIG. 9 is an assembled, isometric view of the housing in FIG. 1 when it is folded.
Figure 10:
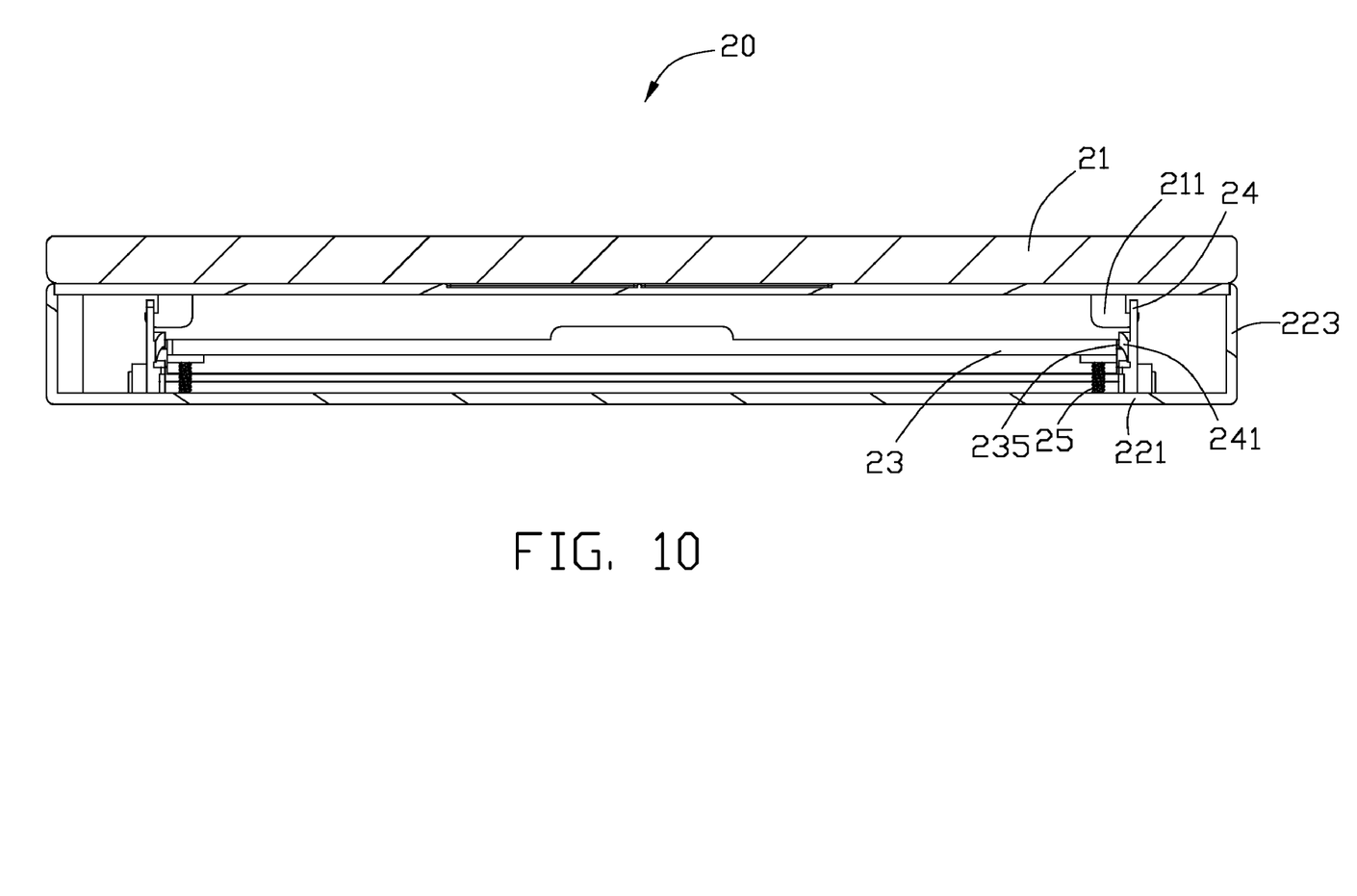
FIG. 10 is a side, cross-sectional view of the housing of FIG. 9, taken along the line X-X in FIG. 9.

Referring to FIGS. 9 and 10, when the notebook is in a folded state, the first cover 21 is folded over of the second cover 22. In this state, the lock portions 211 are secured to the lock receiving portions 243.

To open the first cover 21, the contact portion 231 is pressed up so that the handle 23 rotates a predetermined degree relative to the pivot shaft 233 and compresses the resilient members 25 with the resisting portions 237, then the resilient members 25 become compressed and accumulate potential energy. Simultaneously, the cylindrical arms of the transmission portions 235 of the handle 23 slide along the slanted surfaces of the transmission portions 241 of the latching members 24, thus driving the lock receiving portions 243 outwards and unlatching the lock portions 211. The first cover 21 can now be flipped open. As soon as the pressing force on the contact portion 231 is released, the handle 23 is pushed by the resilient members 25 to rotate back relative to the pivot shafts and returns to its original position.

To fold up the notebook, an external force is applied on the first cover 21 and therefore pushes down the lock portions 211 to engage with the corresponding lock receiving portions 243, the folding up process completes with the lock portions 211 being latched to the lock receiving portions 243.

In opening the above-mentioned housing 20, a pressing force applied on the contact portion 231 is substantially perpendicular to the contact portion 231, and thus firmly stays thereupon. Therefore an attempt to open the first cover 21 seldom fails.

Furthermore, since the transmission portion 241 of the latching members 24 have slanted surfaces, their slope angle will impact the effectiveness of opening the housing 20. The leverage ratio of the space opened between the two latching members 24 to the degree the handle 23 rotates can be increased by increasing the slope angle of the transmission portion 241 of the latching members 24. At a high leverage ratio, the moving distance for the contact portion 231 can be relatively short, and the opening 2231 in FIG. 1 for receiving the contact portion 231 can be small, thus helping in designing small size notebooks.

In the above-mentioned housing 20, the handle 23 and the latching members 24 are separated, the handle 23 is elongated, and the latching members 24 are positioned on the two opposite ends of the handle 23. Two the latching members 24 form two forces to the first cover 21 on different point, this configuration has a higher reliability than that of a conventional housing only employed a hook, which only forms a force to a first cover.

In the housing 20, the lock portion 211 is a resilient hook, the lock receiving portion 243 is a hole. It can be understood that, the lock portion 211 also can be replaced with a hole and the lock receiving portion 243 also can be replaced with a resilient hook.

The lock portions 211 are formed integrally with the first cover 21. It can be understood that, the lock portions 211 also be a separated component positioned on the first cover 21.

In the above mentioned housing 20, the resilient members 25 and the handle 23 are separated components and each resilient member 25 is a spring. It can be understood that, the resilient members 25 may also be integrally formed with the handle 23. Each receiving portion 2215 can be a separated member positioned on the second cover 22. In addition, the receiving portion 2215 may be a protrusion formed on or a depression defined in the base 221.

It can be understood that, a separated member may be positioned on the second cover 22 as a retaining portion 2211. If a portion of the contact portion 231 is exposed out of the second cover 22, the opening 2231 can be omitted.

It can be understood that, the housing 20 can be designed to employ only one latching member 24, correspondingly, only one lock portion and only one first transmission portion is required in this configuration.

It can be understood that, in the above mentioned housing 20, the handle 23, the latching members 24 and the resilient members 25 also can be positioned on the first cover and the lock portions 211 can be positioned on the other cover.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A housing of a foldable electronic device, comprising:
    a first cover including a lock portion;
    a second cover including a retaining portion;
    a handle, disposed on the second cover, including a contact portion, a pivot portion aligned along a common axis, and a first transmission portion, at least a portion of the contact portion being exposed out of the second cover, the pivot portion being capable of engaging with the retaining portion such that the handle is rotatable relative to the pivot portion;
    a latching member disposed on the second cover, including a lock receiving portion configured for engaging with the lock portion and a second transmission portion with a slanted surface configured for engaging with the first transmission portion, wherein, when the handle rotates, it releases the lock portion from the latching member; and
    a resilient member configured for driving the handle to rotate back to its original position after the handle has rotated and the initial force to rotate the handle is released.

2. The housing of the foldable electronic device as claimed in claim 1, wherein the second cover defines an opening therein, and the contact portion can be accessed and pressed therefrom.

3. The housing of the foldable electronic device as claimed in claim 1, wherein the handle further comprises a resisting portion, the second cover further comprises a receiving portion corresponding to the resisting portion, the resilient member is a spring having one end connected to the resisting portion and the other end connected to the corresponding the receiving portion.

4. The housing of the foldable electronic device as claimed in claim 3, wherein the contact portion and the resisting portion are located on the opposite sides of the common axis of the pivot portions.

5. The housing of the foldable electronic device as claimed in claim 1, wherein the handle is elongated, and each end of the handle forms one pivot portion.

6. The housing of the foldable electronic device as claimed in claim 5, wherein the retaining portion is a protrusion defining a U-shaped groove therein.

7. The housing of the foldable electronic device as claimed in claim 5, wherein the retaining portion is a cylindrical protrusion.

8. The housing of the foldable electronic device as claimed in claim 1, wherein the first transmission portion is a cylindrical arm.

9. The housing of the foldable electronic device as claimed in claim 8, wherein one end surface of the first transmission portion is spherical.

10. The housing of the foldable electronic device as claimed in claim 1, wherein the second cover includes a fastening structure, and the latching member is fixed to the fastening structure.

11. The housing of the foldable electronic device as claimed in claim 1, wherein the lock portion defines a hook, and the lock receiving portion defines a hole.

12. The housing of the foldable electronic device as claimed in claim 1, wherein the lock portion defines a hole, and the lock receiving portion defines a hook.

13. A housing of a foldable electronic device, comprising:
    a first cover including two lock portions;
    a second cover including two retaining portions;
    a handle, disposed on the second cover, including a contact portion, two pivot portions aligned along a common axis, and two first transmission portions, at least a portion of the contact portion being exposed out of the second cover, the pivot portions being capable of engaging with the retaining portions such that the handle is rotatable relative to the pivot portions;
    two latching members disposed on the second cover, each latching member including a lock receiving portion configured for engaging with one lock portion and a second transmission portion with a slanted surface configured for engaging with one first transmission portions, wherein, when the handle rotates, it releases the lock portions from the latching members; and
    a resilient member configured for driving the handle to rotate back to its original position after the handle has rotated and the initial force to rotate the handle is released.

* * * * *